(12) United States Patent
Kwon (10) Patent No.: US 9,108,774 B2
(45) Date of Patent: Aug. 18, 2015

(54) STOPPER FOR PACKAGING CONTAINER (76) Inventor: Si Joong Kwon, Bucheon-si (KR)

( * ) Notice: Subject to any disclaimer, the term of this patent is extended or adjusted under 35 U.S.C. 154(b) by 0 days.

(21) Appl. No.: 13/574,144

(22) PCT Filed: Dec. 29, 2010

(86) PCT No.: PCT/KR2010/009455
§ 371 (c)(1),
(2), (4) Date: Jul. 19, 2012

(87) PCT Pub. No.: WO2011/093597
PCT Pub. Date: Aug. 4, 2011

(65) Prior Publication Data
US 2012/0298666 A1    Nov. 29, 2012

(30) Foreign Application Priority Data

Jan. 28, 2010  (KR) .................. 10-2010-0008167
Mar. 8, 2010   (KR) .................. 10-2010-0020588

(51) Int. Cl.
| B65D 17/32 | (2006.01) |
| B65D 41/34 | (2006.01) |
| B65D 55/16 | (2006.01) |
| B29C 45/33 | (2006.01) |
| B29C 45/44 | (2006.01) |
| B29L 31/56 | (2006.01) |

(52) U.S. Cl.
CPC .......... B65D 41/3428 (2013.01); B29C 45/332 (2013.01); B29C 45/44 (2013.01); B65D 55/16 (2013.01); *B29L 2031/56* (2013.01)

(58) Field of Classification Search
CPC ............................ B65D 55/16; B65D 41/3428

USPC ................. 220/268, 839; 215/252, 258, 235; 222/541.5, 541.6, 153.14, 153.01
See application file for complete search history.

(56) References Cited

U.S. PATENT DOCUMENTS

| 5,360,126 A * | 11/1994 | Snyder et al. ................. 215/252 |
| 6,439,410 B1 * | 8/2002 | Dubach .......................... 215/235 |
| 6,474,491 B1 * | 11/2002 | Benoit-Gonin et al. ...... 215/252 |
| 7,731,042 B2 * | 6/2010 | Blomdahl et al. ............ 215/235 |
| 2006/0163188 A1 * | 7/2006 | Lagler ............................ 215/235 |
| 2010/0326948 A1 * | 12/2010 | Campbell ..................... 215/252 |

FOREIGN PATENT DOCUMENTS

| JP | 2004-307006 A | 11/2004 |
| JP | 2006-341924 A | 12/2006 |
| KR | 10-0855086 B1 | 8/2008 |
| KR | 10-0882255 B1 | 2/2009 |

OTHER PUBLICATIONS

International Search Report of International Application No. PCT/KR2010/009455, dated Aug. 11, 2011.

* cited by examiner

*Primary Examiner* — Anthony Stashick
*Assistant Examiner* — James Way
(74) *Attorney, Agent, or Firm* — Kile Park Reed & Houtteman PLLC (57) ABSTRACT

A cap for a bottle or container. The cap includes bridges for checking whether a screw-coupling type cap is opened or not. A hinge portion where an inner concave groove is formed enabling a stable connection of a cap body and a fixing ring, thereby maintaining a set opening angle of the cap body in case of opening, to prevent the cap body from drooping and being shaken.

7 Claims, 12 Drawing Sheets

FIG. 1

(PRIOR ART)

FIG. 2

(PRIOR ART)

FIG. 3

(PRIOR ART)

STOPPER FOR PACKAGING CONTAINER

TECHNICAL FIELD

The present invention relates to a cap for a bottle or container, and more particular to a cap for a container, including bridges for checking whether a screw-coupling type cap is opened or not and a hinge portion where an inner concave groove is formed, thereby displaying whether the cap is opened or not, thereby maintaining a set opening angle of the cap body in case of opening, to thus prevent the cap body from drooping and being shaken, and thereby elastically carrying out opening and closing operations, to improve use.

BACKGROUND

In general, a container 100 that contains liquid materials of oil, paint and chemical products as well as beverages such as water and milk, includes a container body 110 having a mouth, and a cap 130 that opens and closes the mouth of the container body. The cap is largely classified into a screw-coupling type or a one-touch type according to an opening and closing structure.

Figure 1:
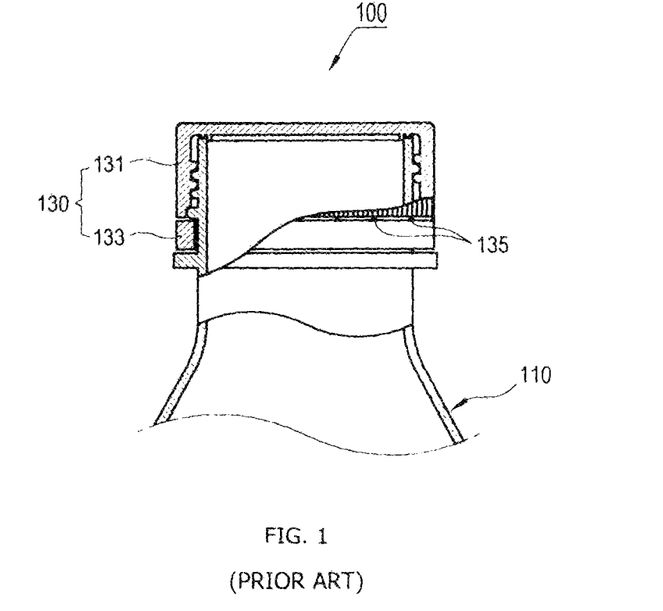
FIG. 1 is a cross-sectional view of a conventional screw-coupling type cap that is closed on top of a container.
Figure 2:
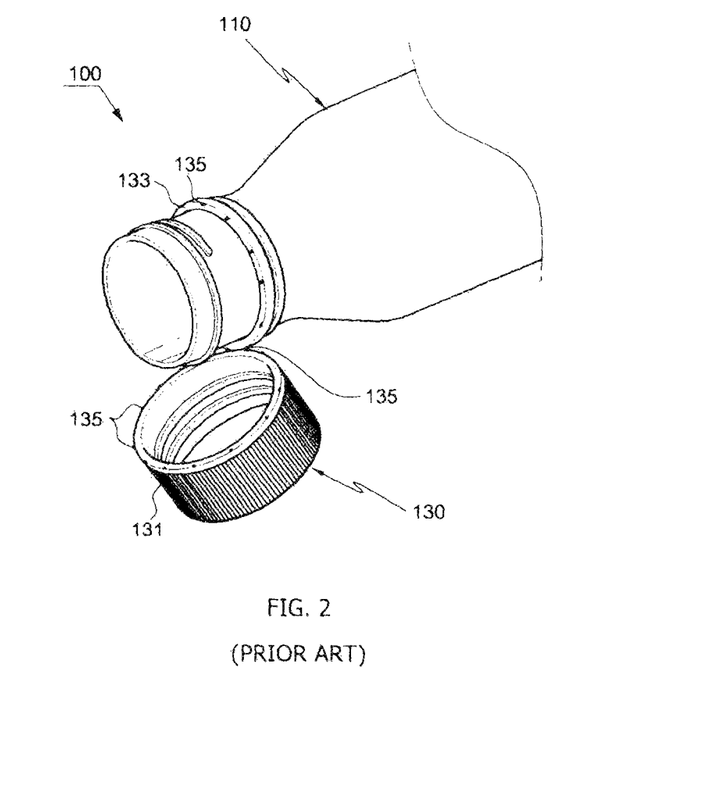
FIG. 2 is a perspective view showing a state of opening the cap with respected to the container of FIG. 1.

In the case of a screw-coupling type cap 130 shown in FIGS. 1 and 2, a female screw portion is formed on an inner circumferential surface of the cap 130 in correspondence to a bottle or container body 110 on which a male screw portion is formed on an outer circumferential surface of the mouth of the container body 110. In the case that the cap is completely separated from the container body, it may be polluted or lost. Accordingly, a fixing ring 133 for preventing the cap from being separated from the container body 110 is provided at a lower portion of cap body 131 so that the cap is maintained connected with the container body 110 when the cap is opened with respected to the container body 110.

In addition, the cap body 131 and the fixing ring 133 are connected by a plurality of bridges 135 that are radially formed. When the cap is opened, the bridges 135 are separated to then enable a user to recognize whether or not the container 100 has been opened.

Since the fixing ring 133 is combined with the container body 110 so as to retain the cap in a posture connected to the container body in the above-described conventional technology, the opened cap body 131 is connected together with the fixing ring 133, and the cap body 130 can drop downwards by dead weight at the time of pouring the container contents, or can be caught by the mouth or chin of a user. This can provide the user with a feeling of discomfort. In addition the cap can become polluted by the container contents.

Figure 3:
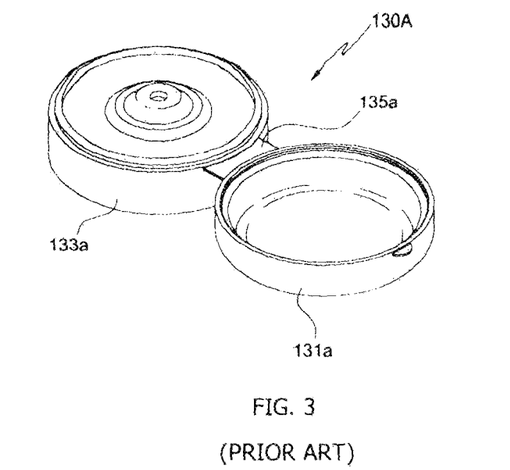
FIG. 3 is a perspective view showing an opened state of a one-touch type stopper or cap.

In the case of a one-touch type container cap 130A shown in FIG. 3, a fixing ring 133a that is fixed to a container body and a cap body 131a that performs opening and closing operations are connected by a hinge portion 135a.

The hinge portion 135a is formed with a relatively thin thickness, in comparison with the cap body 131a and the fixing ring 133a. A width of the hinge portion 135a that connects between the cap body 131a and the fixing ring 133a is formed in a fashion that the width becomes gradually large as it goes toward both sides of the hinge portion from the middle portion of the hinge portion in correspondence to spaces between the cap body 131a and the fixing ring 133a at the time of opening the cap of the container. Accordingly, the cap body can be stably connected with the container body at the time of opening.

However, the screw-coupling type cap having bridges according to the conventional art has a technical limit with respect to an undercut treatment and thereby makes it difficult to perform a stable connection between the cap and the container.

To solve the above problems or defects, it is an object of the present invention to provide a cap for a container, including bridges for checking whether a screw-coupling type cap is opened or not and a hinge portion where an inner concave groove is formed, thereby displaying whether the cap is opened or not, and maintaining a set opening angle of the cap body in case of opening, to thus prevent the cap body from drooping and being shaken, and thereby elastically carrying out opening and closing operations, to improve use.

To accomplish the above and other objects of the present invention, according to one aspect of the present invention, there is provided a cap for a container, the cap comprising: a fixing ring for preventing separation from a container body; a cap body for opening and closing access to the container body, where a screw portion is formed on an inner circumferential surface of the cap body; a hinge portion for connecting the fixing ring and the cap body; and a plurality of bridges formed between the cap body and the fixing ring, which are separated if the cap is opened, wherein a cutting line for extending a connection length to the cap body is formed in the fixing ring around a lower portion of a hinge portion, and wherein a concave groove, which is formed on an inside portion of the cap body and the fixing ring by an inner slider of an injection molding machine, is formed in the hinge portion in such a way that the concave groove is formed with a level difference between the cap body and ribs of the fixing ring.

A cap for a container according to the present invention includes bridges for checking whether a screw-coupling type cap is opened or not and a hinge portion where an inner concave groove is formed, thereby displaying whether the cap is opened or not, thereby enabling the stable connection of a cap body and a fixing ring, thereby maintaining a set opening angle of the cap body in case of opening, to prevent the cap body from drooping and being shaken, and thereby elastically carrying out opening and closing operations, to improve use.

THE DRAWINGS

FIG. 5b is a cross-sectional view of FIG. 4a.

FIG. 8 is a bottom perspective view of FIG. 7a.

FIG. 9 is a perspective view showing a state of use of FIG. 7a.

FIG. 10 is a longitudinal cross-sectional view of FIG. 7a.

FIG. 10a is an enlarged detail view of a hinge portion circled of FIG. 10.

FIG. 10b is an enlarged detail view of a portion circled of FIG. 10.

FIG. 11 is a bottom view of FIG. 7a.

FIG. 13 is an enlarged detail view of a hinge portion that is viewed from the inside of the cap of FIG. 7a.

FIG. 16 is a perspective view showing an opened state of the cap depicted in FIG. 15a.

FIG. 18 is a perspective view showing an opened state of FIG. 17a.

DETAILED DESCRIPTION

Preferred embodiments of the present invention will be described with reference to the accompanying drawings.

As shown in FIGS. 7 to 14, a cap 30 for a container or bottle 10 (note FIG. 9) according to an embodiment of the present invention, includes: a fixing ring 33 for preventing separation from the container or bottle body 10 and preventing unintended rotation; a cap body 31 for opening and closing the container or bottle 10, where a screw portion 311 is formed on an inner circumferential surface of the cap body 10. A hinge portion 35 (note FIG. 7b) connects the fixing ring 33 and the cap body 31 and a plurality of bridges 39 are formed between the cap body 31. The plurality of bridges 39 between the fixing ring 33 and the cap body 31 are separated when the cap 30 is opened for the first time. In addition, a cut line 37 is fashioned partially around the fixing ring 33 (note FIG. 10a). This cut line 37 extends peripherally through the fixing ring and extends peripherally in both directions from a portion beneath the hinge portion 35. In addition, a concave groove "a" (note FIG. 7b), is formed in an inside portion of the cap body 31 and the fixing ring 33 by an inner slider of a cap injection molding machine 200, which forms in the hinge portion 35 in such a way that the concave groove "a" is formed between the cap body 31 and ribs of the fixing ring 33.

Here, the cap injection molding machine 200 is specially designed in order to injection-mold caps for bottles or containers according to the present invention.

Figures 4, 4A:
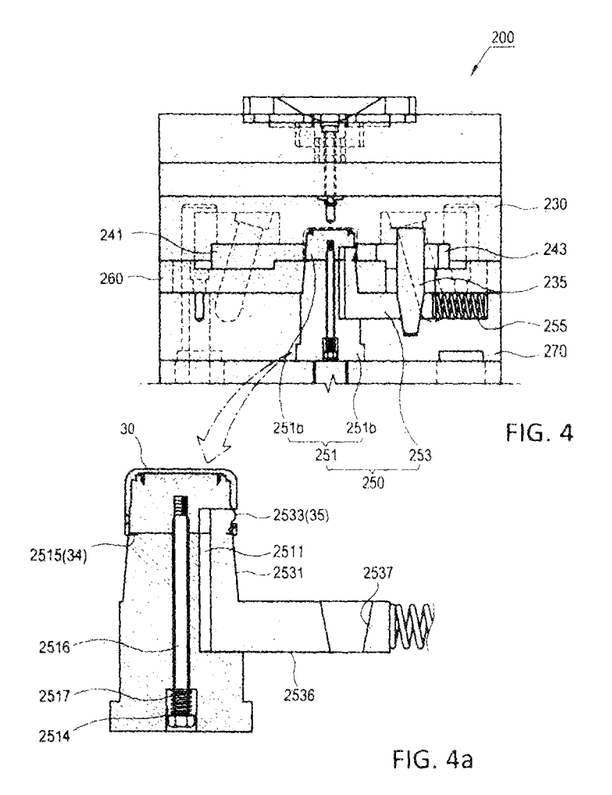
FIG. 4 is a partial cross-sectional view of a cap injection molding machine according to an embodiment of the present invention in order to manufacture a container cap according to the present invention.
FIG. 4a is an enlarged detail view of a portion of the injection molding machine depicted in FIG. 4.
Figure 5A:
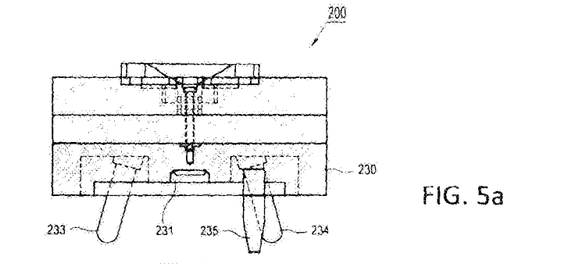
FIG. 5a is a cross-sectional view showing a varying state of FIG. 4.
Figure 5B:
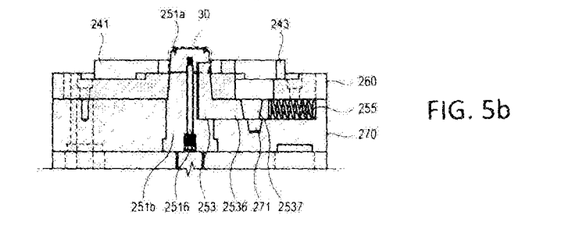
Figure 6:
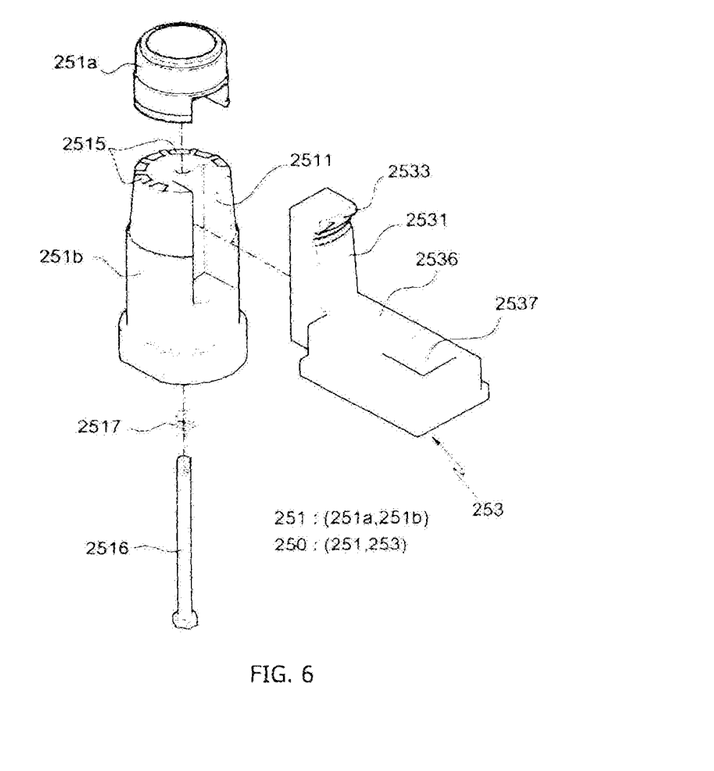
FIG. 6 is an exploded perspective view showing a core unit of FIG. 4b.

As shown in FIGS. 4 to 6, the cap injection molding machine 200 includes: an upper circular plate 230 having an upper molding portion 231 that molds the upper portion of a cap outer shape and a pair of slider operating pins 233 and 234 that are on aslope to both sides of the upper molding portion 231; a pair of outer sliders 241 and 243 are horizontal slid in mutually opposition to each other by the slider operating pins 233 and 234 on a stripper 260 that is located below the upper circular plate 230 and molds the lower portion of the cap outer shape; and a core unit 250 molds a cap inner shape.

The core unit 250 includes: a core body 251 in which a pocket 2511 is concavely formed at a portion corresponding to the cap hinge portion for undercut treatment of the cap hinge portion; and an inner slider 253 in which has an undercut portion 2533 for molding the cap hinge portion is installed so as to go in and out with respect to the pocket 2511.

The undercut portion 2533 is protrudingly formed at one side of the upper portion of the inner slider 253. In the case of the inner slider 253, an insert portion 2531 that is located in the inside of the pocket 2511 and a support portion 2536 that is extended from the insert portion 2531 to the outside of the pocket 2511 and horizontally slid on the lower circular plate 270, in which a wedge hole 2537 is formed on the support portion 2536, are integrally formed. In addition, an elastic member 255 which pushes the inner slider toward the inside of the pocket is provided at the rear end of the inner slider 253.

In addition, a wedge 235 which is inserted into and released from the wedge hole 2537 of the inner slider 253 is provided in the upper circular plate 230.

The inner slider 253 is configured in a manner that the undercut portion 2533 of the insert portion 2531 protrudes outwards to thus mold a concave groove "a" (see FIG. 9) of the cap hinge portion 35 during injection-molding a cap, and the undercut portion 2533 of the insert portion 2531 enters the inside of the pocket 2511 of the core body 251 to thus avoid releasing of the cap from being interfered with during releasing the completely molded cap.

Figure 8:
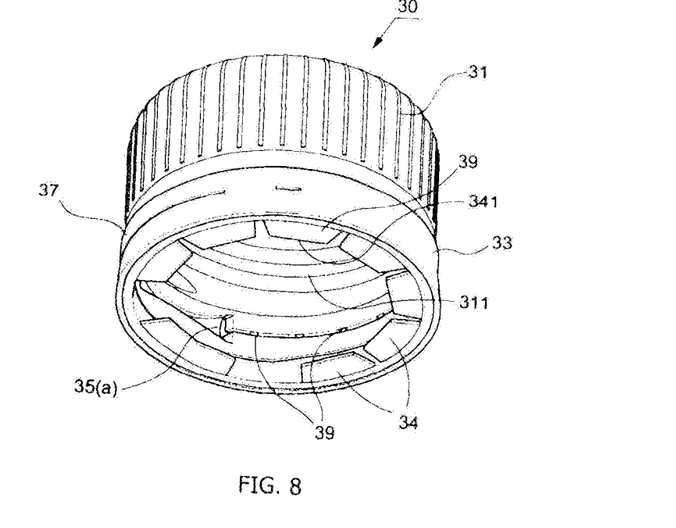
Figure 9:
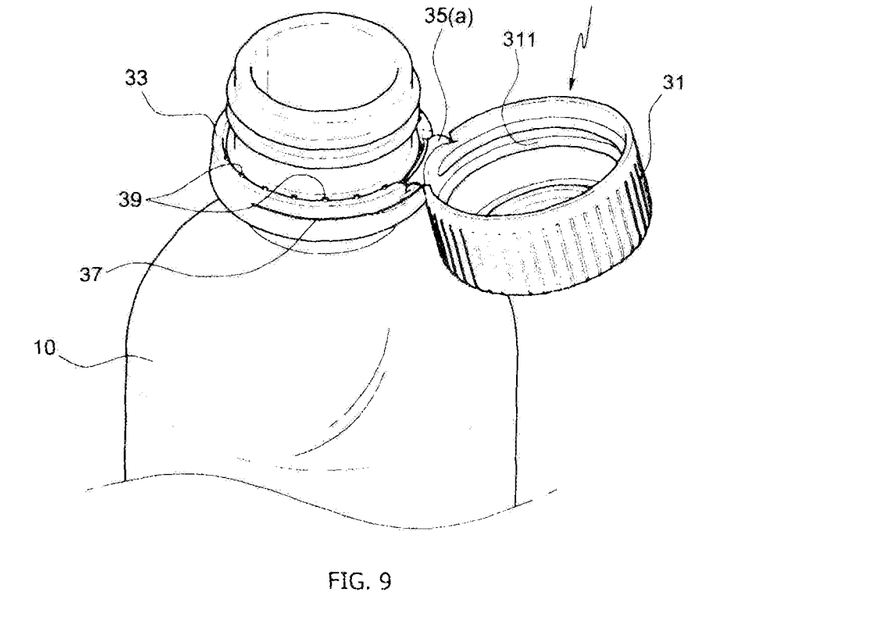

In addition, the core body 251 is cut so as to be separated into an upper core frame 251a and a lower core frame 251b around a support wing molding portion 2515 that molds support wings 34 (see FIG. 8). The upper core frame 251a and the lower core frame 251b are connected by a connection screw 2516 whose screw head is placed in an inner space 2514 located below the lower core frame 251b and penetrates the lower core frame 251b to then be screw-connected with the upper core frame 251a. A coil spring 2517 is provided between the lower core frame 251b and the screw head of the connection screw 2516.

In addition, outer sliders 241 and 243 are symmetrically mold the lower portion of the cap outer shape and horizontally move on the stripper 260.

The cap injection molding machine 200 having the above-described configuration is set to make the upper circular plate 230 and a pair of the outer sliders 241 and 243 mold the cap outer shape, while the inner slider 253 of the core unit 250 protrudes from the outer circumference of the core unit 250, so that the undercut portion 2533 of the insert portion 2531, located in the pocket 2511 formed in the core unit 251, molds the concave grooves of the cap.

The inner slider 253 maintains the position firmly against pressure generated at the time of injecting a resin molten solution, since the support portion 2536 is fixed by the wedge 235, the upper portion of the wedge 235 is fixed to the upper circular plate, and the lower portion of the wedge 235 is inserted into a groove 271 formed on the lower circular plate 270.

Here, the upper core frame 251 and the lower core frame 251b separated from the core body 251 maintain a mutually close relationship by the connection screw 2516 and the elastic force of the coil spring 2517.

At a step of discharging the molded container cap after having passed through the step of injecting and hardening the resin molten solution, the upper circular plate 230 rises up to make the slider operating pins 233 and 234 fixed to the upper circular plate and the wedge 235 rise up.

If the inclined slider operating pins 233 and 234 rise up, a pair of the outer sliders 241 and 243 widen laterally, and the wedge 235 secedes from the wedge groove 2537 of the inner slider support portion 2536.

Here, the inner slider 253 from which the wedge 235 has separated and is pushed out to the inside of the pocket 2511 of the core body 251 by the elastic member 255 that is formed at the rear end thereof, and the undercut portion 2533 of the insert portion 2531 comes into the inside of the pocket 2511, to thereby allow the molded cap to be discharged without causing any interference.

In addition, the core body 251 that is separated into the upper core frame 251a and the lower core frame 251b is caught by the support wing 34 that is formed on the cap 30 at the time of a rise-up of the stripper 260 for discharging the cap, and thus the upper core frame 251a is lifted up from the lower core frame 251b instantaneously together with the cap 30 that is an injection molding product. Accordingly, the gap between the upper core frame 251a and the lower core frame 251b becomes spaced and the support wing 34 of the cap passes smoothly through the gap.

When the upper core frame 251a is lifted up, the screw-coupled connection screw 2516 rises up together with the upper core frame 251a. The rise-up gap becomes about 5 mm or so.

Then, the connection screw 2516 that has risen up together with the upper core frame returns to the original position by the coil spring 2517 that is provided between the screw head of the connection screw 2516 and the lower core frame 251b, and the upper core frame 251a becomes again in contact with the lower core frame 251b. In a separate way, the stripper 260 that proceeds to rise up persistently pushes up the cap 30 to then discharge the cap.

Meanwhile, the screw portion 311 of the cap may be transformed as the cap is compulsively discharged by the stripper. However, since the whole circumference of the inner circumferential surface of the cap is under equal pressure, at a state where hardening proceeds and flexibility is given, the shape of the screw portion is molded.

In a reverse way after having discharged the cap, the stripper 260 returns to the original position, the upper circular plate 230 descends and the slider operating pins 233 and 234 and the wedge 235 descend. As the slider operating pins 233 and 234 descend, the outer sliders 241 and 243 horizontally move and return to the original position in opposition to the descending slider operating pins 233 and 234. As the wedge 235 descends, the inner slider 253 is fixed to the outer circumference of the core unit 250 so that the undercut portion 2533 protrudes, to thereby prepare for the next injection molding operation.

As described above, the container cap injection molding machine 200 includes an inner slider 253 for molding the concave groove of the cap hinge portion so as to come in and out with respect to the core body 251. Accordingly, the screw-coupling type cap 30 including bridges 39 (see FIGS. 8 and 9) for checking whether the cap is opened or not between the cap body 31 and the fixing ring 33, and the concave groove hinge portion 35 can be injection molded in an accurate and precise form.

In addition, in the case of the core unit 250, the core body 251 is separately formed into the upper core frame 251a and the lower core frame 251b on the basis of the molding portion of the cap support wing, to thereby smoothen secession of the support wing, and to thus minimize deformation and inferiority and enhance quality of the cap that is an injection molding product.

Figure 13:
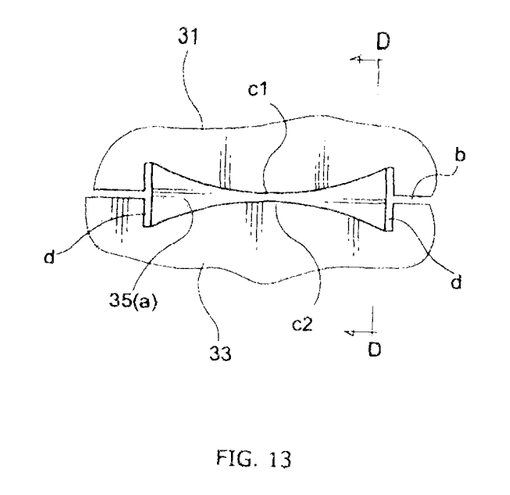
Figure 14:
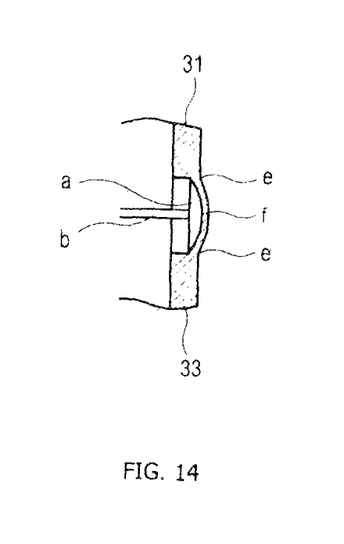
FIG. 14 is a cross-sectional view cut along a section line D-D of FIG. 13.

As shown in FIGS. 13 and 14, a concave groove "a" of the hinge portion 35 is molded by the inner slider of the cap injection molding machine 200 is formed in a general shape of an opposing pair of isosceles triangles in which the concave groove "a" is surrounded by arc-shaped curvature portions "c1" and "c2" where the respective peaks of the cap body 31 and the fixing ring 33 lie adjacent to an extension line of a boundary line "b" between the cap body 31 and the fixing ring 33, and straight line portions "d" that link both ends of the two arc-shaped curvature portions "c1" and "c2" and the straight line portions "d" are preferably cut open.

The mutual gap and curvature shapes of the two arc-shaped curvature portions "c1" and "c2" are designed to have a set opening angle maintained in a tensile form at the time of opening.

The hinge portion 35 is formed outwards in a convex curved form as the width from the top to the bottom becomes large, and becomes gradually thin toward a convex peak "f" from end points "e" where the cap body 31 and the fixing ring 33 are connected with a step difference. Accordingly, it is desirable to form the convex peak "f" in the minimum thickness.

For a cap opening operation, the shape of the concave groove "a" of the hinge portion 35 and the ribs and the stepped portion of the cap body 31 and the fixing ring 33 should be accurately formed. Unless they are accurately formed, a movement that opens the cap body 31 wide is not generated.

As described above, the hinge portion 35 requires for a precise dimension management of the stepped portion, thickness, outer convexity, and a shape of the opposing pair of isosceles triangles of the concave groove "a." In the case that the concave groove "a" is not angularly formed but roundly formed, an angle that opens the cap body wide is not made. Thus, it is difficult to perform the function of the hinge portion 35.

The concave groove "a" having an accurately formed stepped portion accompanies an undercut portion at the time of injection molding, and can be injection-molded through the cap injection molding machine 200 having the inner slider 253.

In addition, since the concave groove "a" of the hinge portion 35 is formed in a shape of opposing isosceles triangles in which the concave groove "a" is surrounded by arc-shaped curvature portions "c1" and "c2" where the respective peaks of the cap body 31 and the fixing ring 33 lie adjacent to an extension line of a boundary line "b" between the cap body 31 and the fixing ring 33, and straight line portions "d" that link both ends of the two arc-shaped curvature portions "c1" and "c2" and the straight line portions "d" are preferably cut open, the set opening angle is stably maintained in a tensile form at the time of opening, so that the cap body 31 does not droop and thus is not shaken unstably.

A design of an opening angle of the cap body may vary according to use of the bottle or container. In particular, a bottle for drinking water is designed so that a cap body does not contact the nose of a user during drinking.

In addition, since the opening angle is stably maintained in a tensile form, the opening angle of the cap body is maintained upright and is prevented from being folded or drooping, when the container is inclined at the opened state in order to pour the liquid contents, to thus enhance use and stability.

In addition, if the cap body 31 is angularly varied above a limit angle at which an elastic force is maximized for opening and closing operations by forming thickness of the convex peak portion "f" the most thinly, an identical magnitude of the elastic force works in a reverse direction. Accordingly, the cap body is spread or closed by the inertia at the rest angular range although the user does not apply any force, to thereby further maintain the cap in an open posture.

In addition, the cutting line 37 becomes open at the time of opening the cap. In this case, a connection length between the cap body 31 and the fixing ring 33 is lengthened, and the cap body 31 is opened at a state where the cap body 31 has been connected with the fixing ring 33 (see FIGS. 10 and 12).

Figure 11:
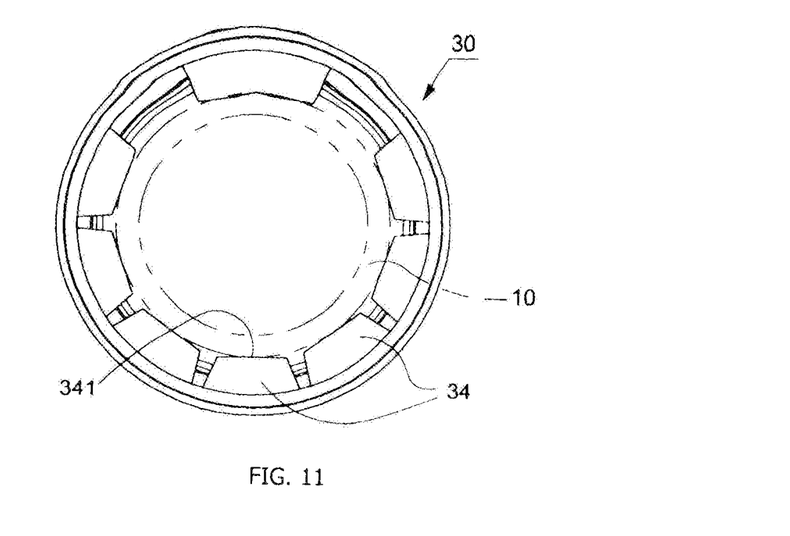
Figure 12:
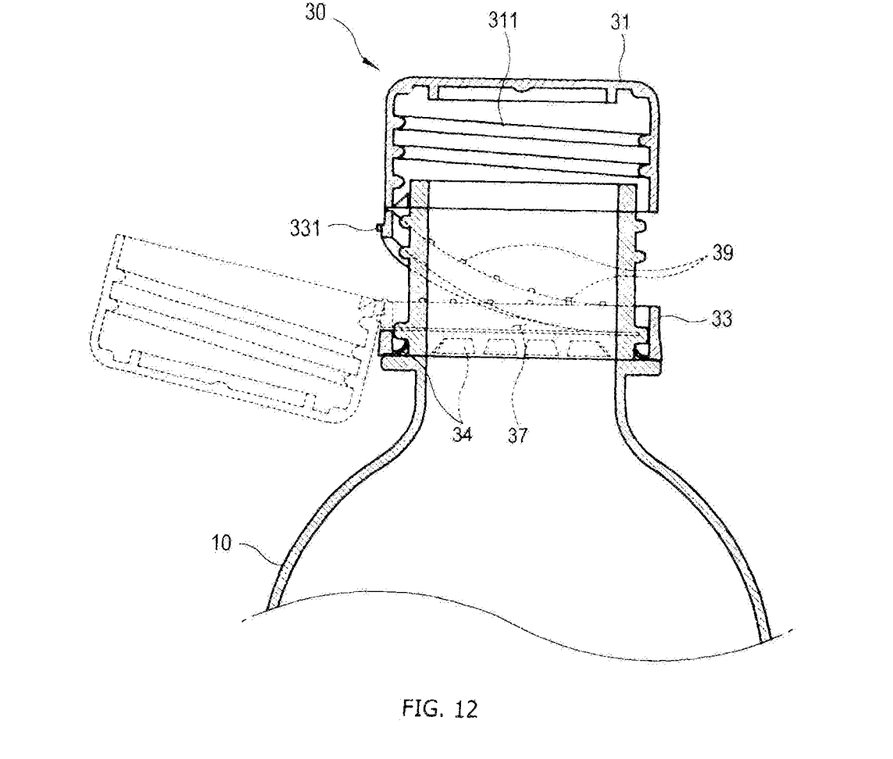
FIG. 12 is a cross-sectional view showing an opened state in phantom of the cap of FIG. 10a as fitted onto a container bottle.

According to an embodiment of the present invention, it is preferable that a plurality of support wings 34 are formed on the inner circumferential surface of the fixing ring 33 and sides 341 that are tangent to the container body are formed in a straight line so that the support wings 34 are tangent to the container body 10 at a single point (see FIGS. 8 and 11).

As described above, since the sides 341 of the support wings 34 that are tangent to the container body are formed in a straight line so that the support wings 34 are tangent to the container body 10 at a single point, a triangular support structure is formed between the container body 10 and the support wings 34, to thereby maintain an elastic force that allows the support wings 34 to be pushed toward the container body.

Figures 10, 10A, 10B:
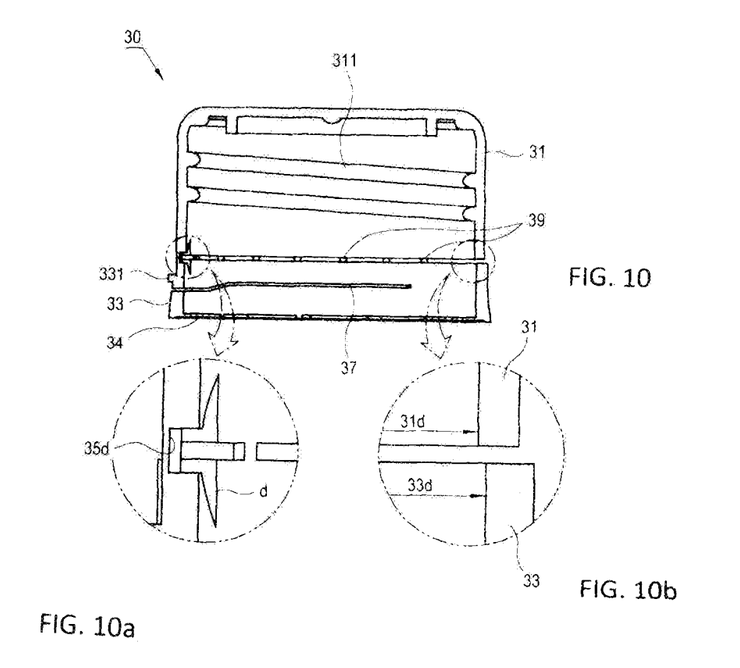

According to the embodiment of the present invention, it is preferable that the inner diameter 33d of the fixing ring 33 is formed with a step difference greater than the inner diameter 31d of the cap body 31 (see FIG. 10c).

As described above, since the inner diameter 33d of the fixing ring 33 is formed greater than the inner diameter 31d of the cap body 31, the cap is softly rotated during opening and closing, and is prevented from freely rotating about the container by the support wings 34.

Figure 7:
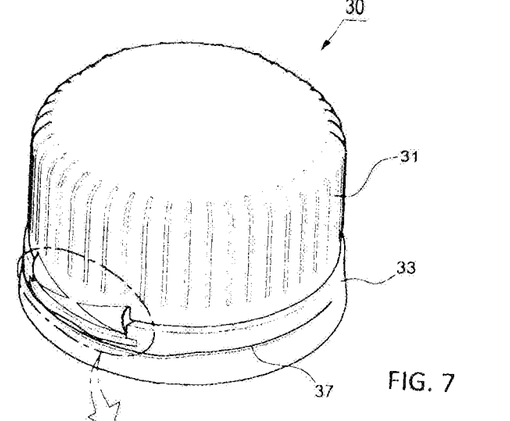
FIG. 7 is a perspective view of a container cap according to an embodiment of the present invention.
Figure 7A:
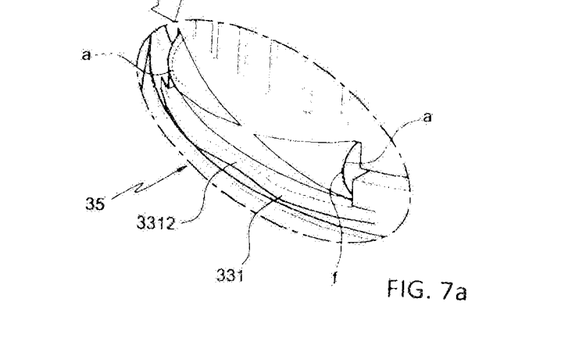
FIG. 7a is an enlarged detail view of a hinge portion of the cap circled in FIG. 7.

In addition, a reinforcement rib 331 is protrudingly formed in an area of the fixing ring 33 where the hinge portion 35 is formed, and a bent portion 3312 corresponding to the outer circumference of the cap body 31 is concavely formed in the reinforcement rib 331 (see FIG. 7b).

The reinforcement rib 331 that is formed in the fixing ring 33 reinforces the area of the hinge portion 35 of the fixing ring 33, and is arcuately formed, to thus increase a withstanding force as well as prevent the cap body 31 from being interfered during opening.

The shapes of the hinge portion 35 and the concave groove "a" according to the present invention are formed in various forms.

According to other embodiments of the present invention, as shown in FIGS. 15 to 22, a hinge portion 35a (FIG. 15), 35b (FIG. 17) or 35c (FIG. 19) includes a center connection portion and outer connection portions that are spaced from each other at both sides of the center connection portion and are in opposition to each other. Any one of the center connection portion and the outer connection portions becomes a folding type connector or folding connectors "X" and the other becomes pullers or a puller "Y" that maintains a set opening angle between the cap body and the fixing ring during opening the cap.

The folding type connector or folding connectors "X" are literally formed in a folding form. Thus, part of the folding type connector or folding connectors "X" is protruded outwards, and the concave groove "a" is deeply formed in the folding type connector or folding connectors "X." In addition, the folding type connector or folding connectors "X" perform a connection function between the cap body 31 and the fixing ring 33 and also assist the puller or pullers "Y."

In contrast, the puller or pullers "Y" play a role of pulling the cap body 31 and the fixing ring 33 to thereby prevent a gap between the cap body 31 and the fixing ring 33 from becoming open above a set angle during opening.

Figures 15, 15A:
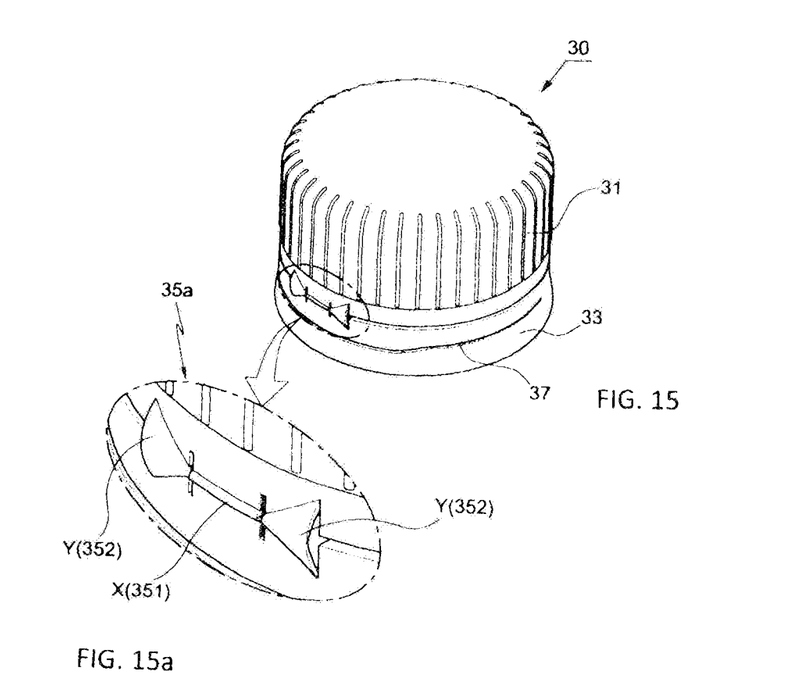
FIG. 15 is a perspective view of a cap according to another embodiment of the present invention.
FIG. 15a is an enlarged detail view of a hinge portion circled in FIG. 15.
Figure 16:
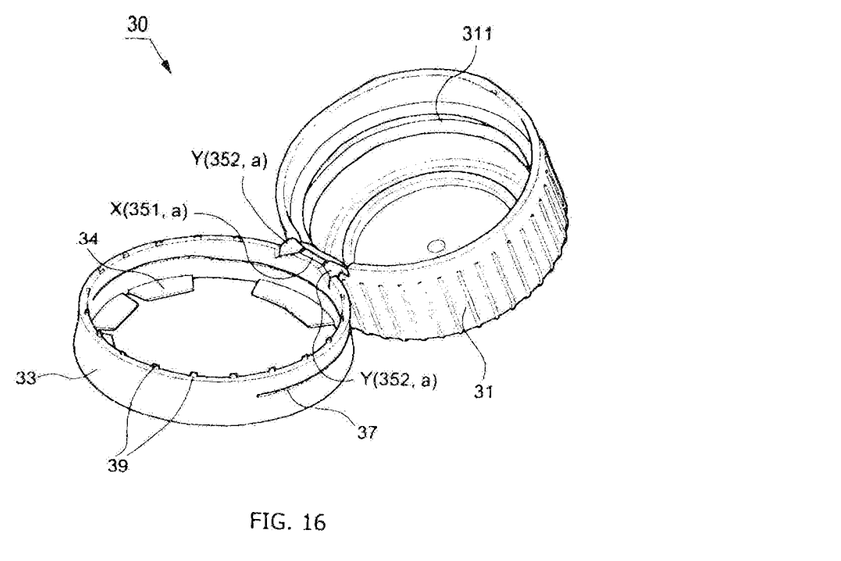

As shown in FIGS. 15 and 16, according to another embodiment of the present invention, the hinge portion 35a is configured so that the center connection portion 351 is formed into the folding connector "X" to thus horizontally form the concave groove "a" on the hinge portion 35a, and the outer connection portions 352 become more distant outwards from the center connection portion 351 and are formed into the pullers "Y" that widen the width from the top to the bottom and are formed in a convex curvature form.

The hinge portion 35a maintains only a connection state between the cap body 31 and the fixing ring 33 since the center connection portion 351 becomes the folding connector "X," and the outer connection portions 352 at both sides of the center connection portion 351 become the pullers "Y" to thus apply pulling elastic forces that maintain the opening angle at both sides thereof during opening, and to thereby maintain the set opening angle so as to prevent the cap body from drooping.

In addition, the outer connection portions 352 formed of the respective pullers "Y" are formed gradually outwards in a convex curvature form. The convex peak portion is formed in minimum thickness as the width from the top to the bottom becomes large. Accordingly, if the cap body 31 is angularly varied above a limit angle at which an elastic force is maximized for opening and closing operations, the cap body operates at the rest angular range although the user does not apply any force, to thereby enhance the use.

Figures 17, 17A:
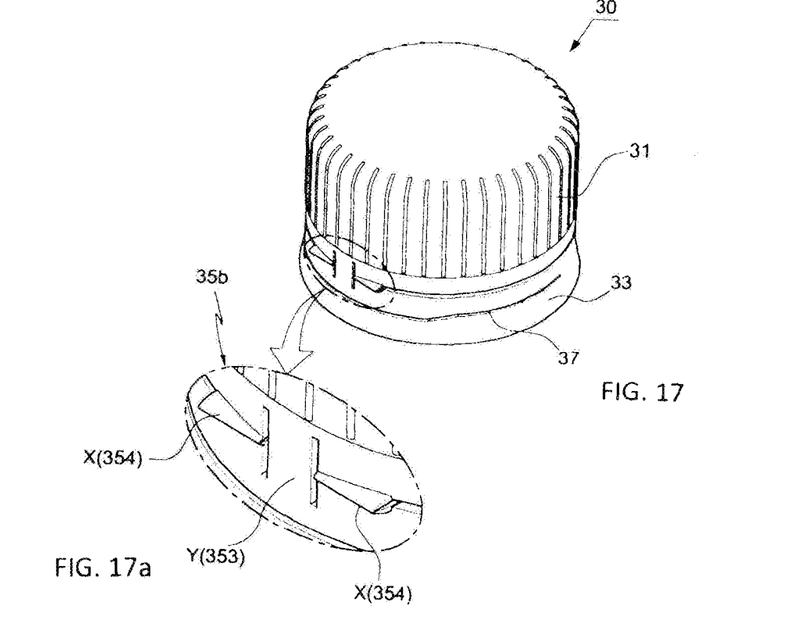
FIG. 17 is a perspective view of a container cap according to still another embodiment of the present invention.
FIG. 17a is an enlarged detail view of a hinge portion circled in FIG. 17.
Figure 18:
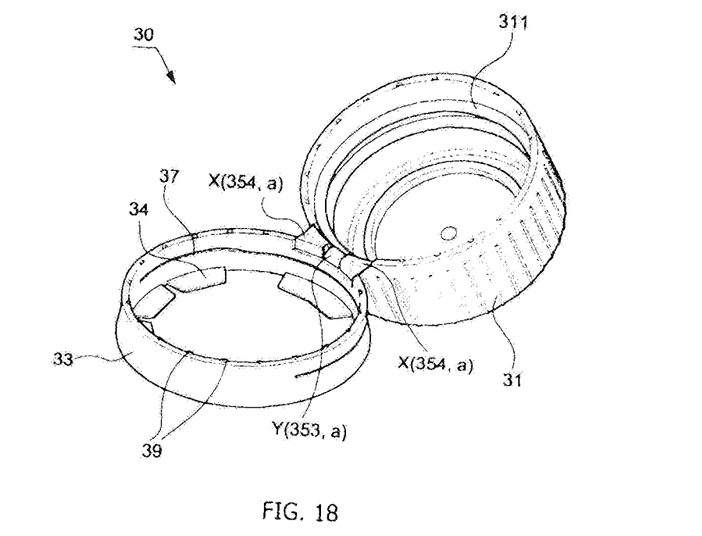

As shown in FIGS. 17 and 18, according to still another embodiment of the present invention, the hinge portion 35b is configured so that the center connection portion 353 is formed into the puller "Y" and the outer connection portions 354 are formed into the folding connectors "X."

The outer connection portions 354 protrude outwards more and more as they become more distant from the center connection portion 353.

The center connection portion 353 of the hinge portion 35b becomes the puller "Y" to thus generate a pulling elastic force and the outer connection portions 354 become the folding connectors "X" to thus assist the puller "Y."

As shown in FIGS. 19 to 22, according to yet another embodiment of the present invention, it is preferable that the center connection portion 355 of the hinge portion 35c is formed into the puller "Y" in which the concave grove "a" is formed in an "L-shape" or a "C-shape" in its cross-section, and the outer connection portions 356 are formed into the folding connectors "X."

Figures 19, 19A:
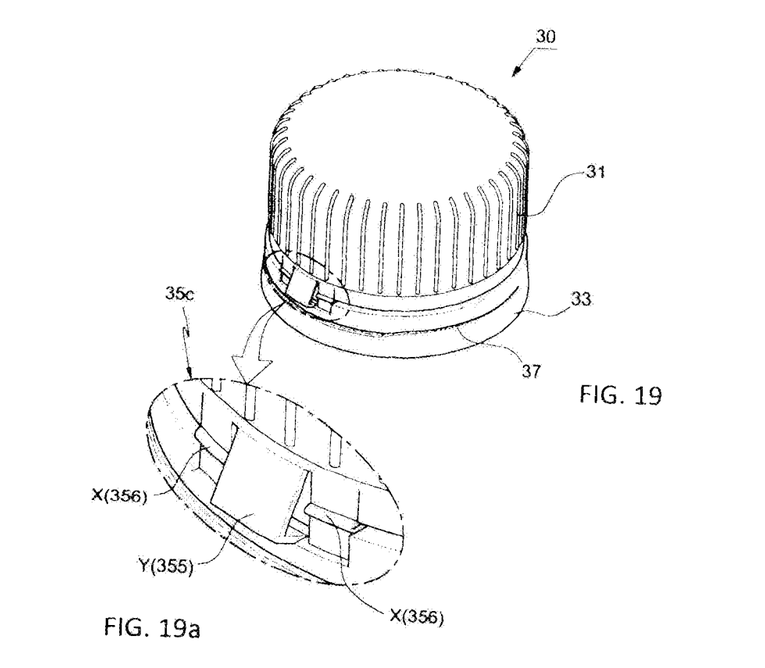
FIG. 19 is a perspective view of a container cap according to yet another embodiment of the present invention.
FIG. 19a is an enlarged detail view of a hinge portion circled in FIG. 19.
Figures 20, 20A:
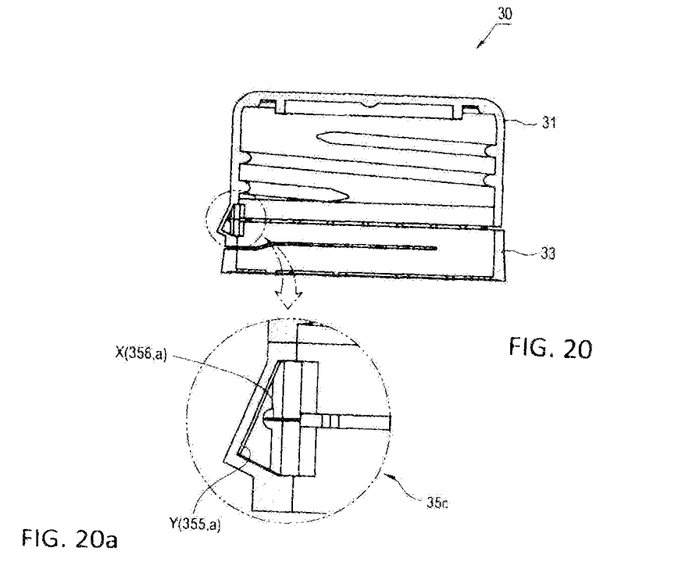
FIG. 20 is a longitudinal cross-sectional view of FIG. 19.
FIG. 20a is an enlarged detail view of a hinge portion circled in FIG. 20.

The hinge portion 35c has a characteristic that the center connection portion 355 becomes the puller "Y" and is protrudingly formed outwards in a bent or curved form, in which a bent portion or a curved portion has been opened wide and returns to the original angle at the time of an opening operation, to then generate a pulling force by an elastic force that maintains a return state.

Figure 21:
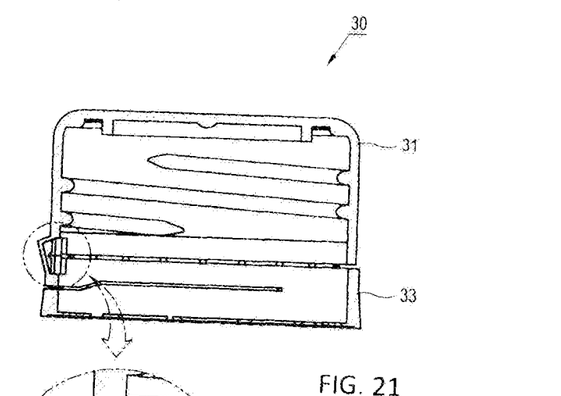
FIG. 21 is a cross-sectional view of a variation of a container cap depicted corresponding to FIG. 20.
Figure 21A:
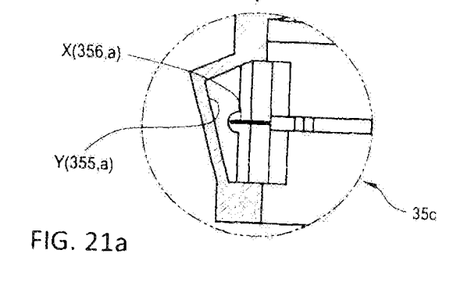
FIG. 21a is an enlarged detail view of a hinge portion circled in FIG. 21.
Figures 22, 22A:
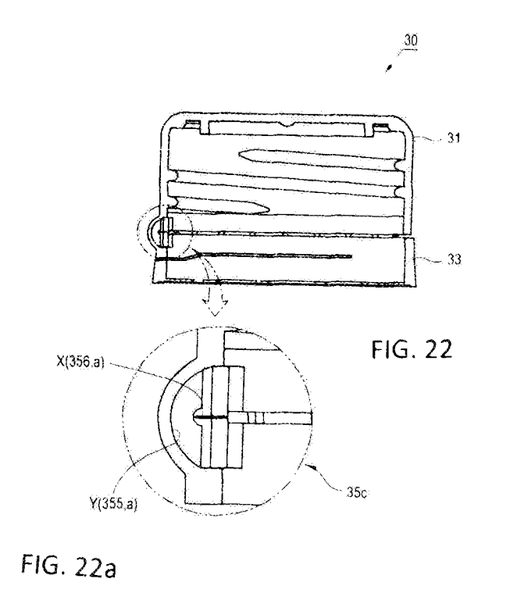
FIG. 22 is a cross-sectional view of still another example corresponding to FIG. 20.
FIG. 22a is an enlarged detail view of a hinge portion circled in FIG. 22.

In the case of the center connection portion 355 that is the puller that is formed in a bent form, the bent portion is located at the lower portion of the center connection portion 355 as shown in FIGS. 19 and 20, or the bent portion is located at the upper portion of the center connection portion 355 as shown in FIG. 21, in which the bent edge portion may be rounded.

As described above, a cap for a bottle or container according to the present invention includes bridges for checking whether a screw-coupling type cap is opened or not and a hinge portion where an inner concave groove is formed, thereby displaying whether the cap is opened or not, thereby enabling a stable connection of a cap body and a fixing ring, thereby maintaining a set opening angle of the cap body in case of opening, to prevent the cap body from drooping or being loose, and thereby elastically carrying out opening and closing operations, to thus improve the use.

In addition, the cap 30 for a packaging container is formed into a screw-coupling type cap having the hinge portion that is provided with each of various types of concave grooves "a" and the bridges displaying whether or not the cap is opened differently from a one-touch type cap, and thus can be manufactured by a cap injection molding machine having an inner slider that comes in and out with respect to a core unit.

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

As described above, a cap for a bottle or container unit according to the present invention is a screw-coupling type cap that includes bridges displaying whether or not the cap is opened and a hinge portion on which an inner concave groove is formed, thereby providing advantages of displaying whether the cap is opened or not, and enabling a stable connection of a cap body and a fixing ring, of maintaining a set opening angle of the cap body in case of opening, to thus prevent the cap body from drooping and being loose, and of elastically carrying out opening and closing operations.

The invention claimed is:

1. A cap for a container for maintaining a cap body at a set open angle so as to prevent the cap body from drooping the cap comprising:
    a fixing ring for preventing separation of the cap from a container body and preventing undesired movement;
    the cap body for opening and closing the container body, where a screw portion is formed on an inner circumferential surface of the cap body;
    a hinge portion for connecting the fixing ring and the cap body; and
    a plurality of bridges formed between the cap body and the fixing ring, which are cut separated if the cap is opened,
    wherein a cutting line for extending a connection length to the cap body is formed in the fixing ring around the lower portion of the hinge portion,
    wherein said hinge portion consists of a central folding type connector and two lateral pullers located on both sides of the central folding type connector,
    wherein said central folding type connector is molded in folded form comprising a concave groove, which is formed to the inside of the cap body in such a way that the concave groove is formed with a step difference between the cap body and the fixing ring,
    wherein said lateral pullers are formed in a general shape of an opposing pair of isosceles triangles and said lateral pullers apply pulling elastic forces such that they will maintain a set opening angle and thus prevent the stopper body from drooping,
    wherein said boundary line between said central folding type connector and said lateral pullers is cut open, and
    a reinforcement rib is located on the fixing ring directly below the central folding type connector, said rib protrudes out from said fixing ring and has a concave shaped outer edge, said outer edge corresponds to the cap body convex outer circumference such that when cap is opened the cap body can swing out until the reinforcement rib contacts the cap body and stops the cap body from opening further.

2. A cap for a container according to claim 1, wherein:
said hinge portion is formed outwards in a convex curved form as a width between a top to a bottom of the hinge portion becomes large, and becomes gradually thin toward a convex peak from end points where the cap body and the fixing ring are connected with a step difference, to thus form the convex peak in a minimum thickness.

3. A cap for a container according to claim 1, wherein:
a plurality of support wings are formed on the inner circumferential surface of the fixing ring and sides that are tangent to the container body are formed in a straight line so that the support wings are tangent to the container body.

4. A cap for a container according to claim 1, wherein:
an inner diameter of the fixing ring is formed greater than an inner diameter of the cap body.

5. A cap for a container according to claim 1, wherein:
said hinge portion includes a center connection portion which is formed into a folding connector to horizontally form a concave groove on the hinge portion, and outer connection portions are formed to widen the width between a top to a bottom of the hinge portion outwards from the center connection portion and are formed into pullers that are formed in a convex curvature form.

6. A cap for a container according to claim 5, wherein:
a center connection portion of the hinge portion is formed into a puller, and the outer connection portions thereof are formed into folding connectors.

7. A cap for a container according to claim 5, wherein:
the center connection portion of the hinge portion is formed into pullers that are formed in at least one of an L-shape and a C-shape in cross-section, and the outer connection portions thereof are formed into the folding connectors.

* * * * *